(12) United States Patent
Wong et al.

(10) Patent No.: US 9,984,408 B1
(45) Date of Patent: May 29, 2018

(54) METHOD, MEDIUM, AND SYSTEM FOR LIVE VIDEO COOPERATIVE SHOPPING

(75) Inventors: Peter C. Wong, Bellevue, WA (US); Fabien G. Hertschuh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 13/483,212

(22) Filed: May 30, 2012

(51) Int. Cl.
*G06Q 30/00* (2012.01)
*G06Q 30/06* (2012.01)

(52) U.S. Cl.
CPC ......... *G06Q 30/0643* (2013.01); *G06Q 30/06* (2013.01)

(58) Field of Classification Search
CPC .............. G06C 30/06; G06C 30/0643; H04N 21/2187; H04N 21/15; H04N 21/8133
USPC ................................................ 705/26.1, 27.1
See application file for complete search history.

(56) References Cited

U.S. PATENT DOCUMENTS

| | | | | |
|---|---|---|---|---|
| 5,767,897 A * | 6/1998 | Howell | ..................... | H04N 7/15 348/14.07 |
| 6,584,493 B1 * | 6/2003 | Butler | ..................... | G06F 3/038 709/204 |
| 8,380,866 B2 * | 2/2013 | Savitzky | ................. | G06F 15/16 455/566 |
| 2001/0044751 A1 * | 11/2001 | Pugliese, III | .......... | G06Q 30/02 705/14.1 |
| 2002/0030637 A1 * | 3/2002 | Mann | .................... | G02B 27/017 345/8 |
| 2002/0072974 A1 * | 6/2002 | Pugliese, III | .......... | G06Q 30/02 705/14.16 |
| 2004/0225716 A1 * | 11/2004 | Shamir | ............. | G06F 17/30873 709/204 |
| 2004/0236830 A1 * | 11/2004 | Nelson | .............. | H04L 29/06027 709/204 |
| 2005/0229227 A1 * | 10/2005 | Rogers | ................... | G06Q 30/02 725/115 |
| 2006/0259369 A1 * | 11/2006 | Bongrazio | ......... | G06Q 30/0603 705/26.41 |
| 2007/0242131 A1 * | 10/2007 | Sanz-Pastor | ........ | H04L 12/5865 348/14.02 |
| 2008/0086386 A1 * | 4/2008 | Bell | .................... | G06Q 30/0206 705/7.35 |
| 2010/0030578 A1 * | 2/2010 | Siddique | ............ | G06Q 10/0637 705/3 |

(Continued)

OTHER PUBLICATIONS

Sep. 2011—http://lifehacker.com/5842191/google%252B-hang-outs-adds-screen-sharing-google-docs-collaboration-and-more.*

*Primary Examiner* — Matthew Zimmerman
(74) *Attorney, Agent, or Firm* — Thomas Horstemeyer, LLP

(57) ABSTRACT

Disclosed are various embodiments for facilitating a cooperative shopping session. A mobile computing device establishes a session with a remote computing device. Product data is displayed by the mobile computing device in association with the session. The product data is shared with the remote computing device in association with the session. The mobile computing device receives an indication of a user interaction with the product data at the remote computing device. The mobile computing device displays the user interaction with the product data in conjunction with the product data and in association with the session.

24 Claims, 4 Drawing Sheets

(56) References Cited

U.S. PATENT DOCUMENTS

| | | | |
|---|---|---|---|
| 2010/0103241 A1* | 4/2010 | Linaker | G06K 9/00979 348/14.02 |
| 2010/0299616 A1* | 11/2010 | Chen | G06Q 10/10 715/753 |
| 2011/0145093 A1* | 6/2011 | Paradise | G06Q 30/02 705/26.41 |
| 2011/0164163 A1* | 7/2011 | Bilbrey | G06F 1/1694 348/333.01 |
| 2011/0217021 A1* | 9/2011 | Dubin | H04N 7/147 386/278 |
| 2011/0246064 A1* | 10/2011 | Nicholson | G01C 21/00 701/467 |
| 2012/0062688 A1* | 3/2012 | Shen | G06F 3/04886 348/14.03 |
| 2012/0092436 A1* | 4/2012 | Pahud | G06Q 10/10 348/14.02 |
| 2012/0233003 A1* | 9/2012 | Calman | G06Q 30/06 705/16 |
| 2012/0303834 A1* | 11/2012 | Adam | H04L 65/4084 709/231 |

* cited by examiner

METHOD, MEDIUM, AND SYSTEM FOR LIVE VIDEO COOPERATIVE SHOPPING

BACKGROUND

A customer's shopping experience can be enhanced in various ways by mobile computing devices. As one example, mobile computing devices allow a customer to obtain detailed product information and product reviews when viewing or evaluating the product. As another example, mobile computing devices allow a customer to find a product at one store then check the price of the same product at another store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to shopping, and more specifically, to a cooperative shopping experience facilitated by a mobile computing device. Various embodiments disclosed herein allow one user, acting in the role of shopper, to establish a cooperative shopping session with another user who acts in the role of adviser. The mobile computing device operated by the shopper obtains product data and shares this product data with a computing device operated by the adviser. The adviser interacts with the shared data to provide feedback to the shopper about one or more products. In some embodiments, the mobile computing device contemporaneously captures, as the shopper visits a store or other retail location, images of products. The product imagery is contemporaneously provided to the adviser's computing device, and the adviser may annotate the product images. For example, if the adviser sees a shelf of cereal boxes, the adviser may circle the image of one of the boxes to focus the shopper's attention on the circled box.

Though many of the examples provided herein are discussed in terms of products, the same techniques can be applied to venues or locations rather than products. For example, the shopper may contact an adviser for help in locating a particular store. The adviser can view the product imagery provided by the mobile computing device as the shopper walks or drives down a street, and can give directions or other feedback to the shopper.

The product data shared by the shopper with the adviser may also include product metadata, such as that rendered on a product detail network page. The adviser may annotate the product metadata, and the shopper may then view the annotated product metadata. For example, the adviser may annotate a particular product attribute such as size or color to indicate to the shopper a particular attribute of interest to the adviser.

In some embodiments, the cooperative shopping session is augmented by a secondary communication channel such as a voice channel, a multimedia channel, a text messaging channel, or an instant messaging channel. Integrating the secondary channel into the cooperating shopping session provides a more desirable shopping experience as compared to having the shopper make a separate phone call to the adviser. In the following discussion, a general description of the system and its components is provided, followed by a discussion of the operation of the same.

Figure 1:
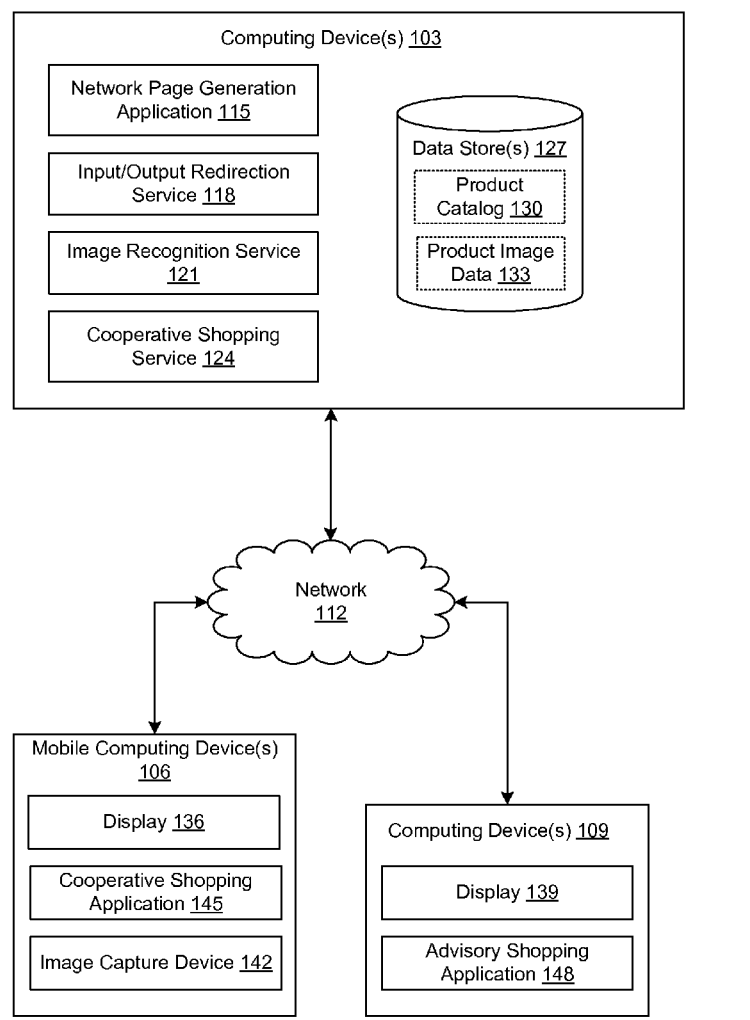
FIG. 1 is a drawing of a networked environment according to one embodiment of the present disclosure.

With reference to FIG. 1, shown is a networked environment 100 according to various embodiments. The networked environment 100 includes one or more computing devices 103 in data communication with one or more mobile computing devices 106 and with one or more computing devices 109 by way of a network 112. The network 112 includes, for example, the Internet, intranets, extranets, wide area networks (WANs), local area networks (LANs), wired networks, wireless networks, or other suitable networks, or any combination of two or more such networks.

A computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in various arrangements.

Various applications and/or other functionality may be executed in the computing device 103 according to various embodiments. The components executed on the computing device 103 include, for example, a network page generation application 115, an input/output redirection service 118, a product image recognition service 121, and a cooperative shopping service 124. The components executed on the computing device 103 may also include other applications, services, processes, systems, engines, or functionality not discussed in detail herein. These components may communicate with each other using various mechanisms, including but not limited to any type of middleware framework. Although the network page generation application 115, the product image recognition service 121, and the cooperative shopping service 124 are shown as separate components in the example embodiment of FIG. 1, in other embodiments these components may be integrated, as should be appreciated.

Also, various data is stored in a data store 127 that is accessible to the computing device 103. The data store 127 may be representative of a plurality of data stores as can be appreciated. The data stored in the data store 127, for example, is associated with the operation of the various applications and/or functional entities of the computing device 103 as described herein. The data stored in the data store 127 includes, for example, a product catalog 130 and product images 133.

The network page generation application 115 is executed in order to generate network pages such as, for example, web pages and/or other types of network content that are provided to the mobile computing device 106 and to the computing device 109. To this end, the network page generation application 115 may include a commercially available hypertext transfer protocol (HTTP) server such as, for example, Apache® HTTP Server, Apache® Tomcat®, Microsoft® Internet Information Services (IIS), and so on.

The product image recognition service 121 is executed in order to match an image with a set of known images in the product images 133 stored on the computing device 103. The product image recognition service 121 may analyze the image in order to extract product attributes that appear on the product's packaging. The product image recognition service 121 may perform an optical character recognition algorithm on the image to attempt to identify product identifiers, names, and other text that may appear on the product's packaging. In some embodiments, the product image recognition service 121 uses image recognition algorithms such as those associated with the SnapTell® technology.

The product image recognition service 121 may be implemented as a web service, which is given an image as input and provides a product identifier as output. In some embodiments, the product image recognition service 121 may also provide a reliability or likelihood output that indicates how well the image matched the product. The product image recognition service 121 may supplement the product identifier output with additional information about a recognized product as obtained from the product catalog 130 located on the computing device 103.

The cooperative shopping service 124 is executed in order to facilitate a cooperative shopping session between a cooperative shopping application 145 that is executing on a mobile computing device 106 and an advisory shopping application 148 that is executing on a computing device 109. For example, the cooperative shopping service 124 may host or create a network site for communication between the two shopping applications 148, 145 and provide each application 148, 145 with a uniform resource locator (URL) that points to this network site.

The cooperative shopping service 124 is utilized when the cooperative shopping application 145 and the advisory shopping application 148 are not communicating as peers but are instead relying on the cooperative shopping service 124 to perform an intermediary function. Thus, in embodiments in which the cooperative shopping application 145 and the advisory shopping application 148 have a peer-to-peer relationship, the cooperative shopping service 124 may not be present.

The input/output redirection service 118 is executed to redirect input and/or output from one application to another application. For example, the input/output redirection service 118 may be instructed by the cooperative shopping service 124 to redirect user input that is generated by an adviser operating the advisory shopping application 148 to be input to the cooperative shopping application 145. Output to a display may be redirected in a similar manner. In this manner, the adviser can control the operation of the cooperative shopping application 145.

The input/output redirection service 118 may be most useful when the cooperative shopping service 124 is acting as an intermediary between the cooperative shopping application 145 and the advisory shopping application 148. In other embodiments, when the cooperative shopping application 145 and the advisory shopping application 148 operate as peers, some or all of the functionality of the input/output redirection service 118 may be implemented instead on the mobile computing device 106. That is, a local redirector may receive user input generated by the adviser in operating the advisory shopping application 148 and provide that input to the cooperative shopping application 145, as if the shopper had generated the input instead of the adviser.

Having discussed the computing device 103, the mobile computing device 106 and the computing device 109 will now be considered. The mobile computing device 106 and the computing device 109 are each representative of a plurality of computing devices that may be coupled to the network 112, such as a processor-based system. The mobile computing device 106 is a mobile device and may be embodied in the form of a personal digital assistant, a cellular telephone, a smartphone, a music player, a video player, a media player, a web pad, a tablet computer system, a game console, an electronic book reader, or other devices with like capability. The computing device 109 may be mobile or stationary and may be embodied in the form of a desktop computer, a laptop computer, a set-top box, a television, a personal digital assistant, a cellular telephone, a smartphone, a music player, a video player, a media player, a web pad, a tablet computer system, a game console, an electronic book reader, or other devices with like capability.

The mobile computing device 106 may include a display 136 such as a liquid crystal display (LCD) screen, a gas plasma-based flat panel display, and so on. The computing device 109 may include a display 139 such as a cathode ray tube (CRT), a liquid crystal display (LCD) screen, a gas plasma-based flat panel display, an LCD projector, or other types of display devices, etc.

Some embodiments of the mobile computing device 106 include an image capture device 142 that captures images of products in physical proximity to the mobile computing device 106. One example of an image capture device 142 is a digital camera. The image capture device 142 may be mounted, for example, so that it faces the rear of the mobile computing device 106 as the user views the display 136. In some embodiments the product images are captured as a live video stream, and various video compression techniques such as motion encoding may be utilized. In other embodiments, a series of still images are captured, and the individual images may be compressed for storage and/or transmission.

The mobile computing device 106 may be configured to execute various applications such as a cooperative shopping application 145. The mobile computing device 106 may be configured to execute applications beyond the cooperative shopping application 145 such as, for example, browser applications, email applications, messaging applications, and/or other applications. The cooperative shopping application 145 is executed in order to facilitate a cooperative shopping experience for a user that is acting in the role of a shopper, in cooperation with a remote user that is acting in the role of an adviser. To this end, the cooperative shopping application 145 may capture live images of products as the shopper visits various stores or other locations and provide these images to the adviser. The cooperative shopping application 145 may then receive annotated product images from the adviser. The cooperative shopping application 145 may also provide the adviser with product metadata, and may then receive indications of the adviser's interaction with the metadata. For example, the adviser may interact with the product metadata shown on a product detail page to obtain further information about a product, to select another product, to perform a product search, etc.

The computing device 109 may be configured to execute various applications such as an advisory shopping application 148. The computing device 109 may be configured to execute applications beyond the advisory shopping application 148 such as, for example, email applications, messaging applications, and/or other applications. The advisory shopping application 148 may be executed in the context of a browser, or may be a standalone application. The advisory shopping application 148 is executed in order to facilitate a cooperative shopping experience for a user that is acting in the role of an adviser, in cooperation with a remote mobile user that is acting in the role of a shopper. To this end, the advisory shopping application 148 may receive live images of products that are captured by the shopper as he visits various stores or other locations. The advisory shopping application 148 may then interact with the product images to annotate the images. For example, the adviser may select an image, highlight an image, draw a circle or other shape around an image, or otherwise annotate the product image. In some embodiments, the advisory shopping application 148 may receive product metadata from the cooperative shopping application 145, and the user may then interact with the product metadata. For example, the adviser may interact with the product metadata shown on a product detail page to obtain further information about a product, to select another product, to perform a product search, etc. Such interactions are provided to the cooperative shopping application 145 and may result in an update to the display of the mobile computing device 106.

The cooperative shopping application 145 and the advisory shopping application are described herein as separate applications. However, the functionality of these two applications can be packaged into the same application. In embodiments in which a single application includes both shopper and advisory functionality, the user may select a role of either shopper or adviser for a particular cooperative shopping session. Furthermore, the role may change from session to session.

Next, a general description of the operation of the various components of the networked environment 100 is provided. To begin, a user interacts with the cooperative shopping application 145 that is executing on a mobile computing device 106. The user may, through the cooperative shopping application 145, begin capturing product images as he shops in a retail store or other location. The user may begin a cooperative shopping session by instructing the cooperative shopping application 145 to contact a user who will be acting in the role of an adviser. For example, the screen rendered by the cooperative shopping application 145 may include a "Contact Adviser" button. In some embodiments, the cooperative shopping application 145 provides a list of candidate advisers that is generated from a contact list associated with the shopper. The cooperative shopping application 145 may allow the shopper to define or configure a default adviser, or may allow the shopper to define or configure a list of favorite advisers and then select an adviser from the list.

Having determined the identity of a particular adviser, the cooperative shopping application 145 establishes a cooperative shopping session with the advisory shopping application 148 that is executing on a computing device 109 operated by the adviser. In some scenarios, the advisory shopping application 148 is resident on the computing device 109 and is executing on the background such that the incoming session request causes the application to become active. In some scenarios, the advisory shopping application 148 is not installed on the computing device 109. In such instances, the session establishment process performed by the cooperative shopping application 145 includes cooperating with an operating system executing on the computing device 109 to download and install the advisory shopping application 148.

In some embodiments, the session establishment process includes asking the adviser before the session is established, thus giving the adviser an opportunity to refuse the session. In some embodiments, if the adviser does not give permission to establish the session within a predefined period of time, the session establishment fails, and the cooperative shopping application 145 may report this failure to the shopper.

The cooperative shopping session may also include a secondary communication channel such as a voice channel, multimedia channel, text message channel, or instant message channel. A secondary channel may enhance the shopping experience by allowing the shopper and the adviser to exchange information other than product data.

Once a cooperative shopping session is established between the shopper and the adviser, product data obtained by the shopper is contemporaneously shared with the adviser as the product data is obtained or is generated by the cooperative shopping application. For example, product images captured by the mobile computing device 106 may be shared by the cooperative shopping application 145 with the advisory shopping application 148. The captured product images may be displayed by both the cooperative shopping application 145 and the advisory shopping application 148, so that the shopper and the adviser view the same products at substantially at the same time.

The cooperative shopping application 145 may also contemporaneously share metadata with the advisory shopping application 148, which may take the form of a product detail network page. The product metadata may be displayed in a different portion of the window that displays the captured product images, or may be displayed in a separate window. In either case, the metadata and the product images are displayed in the same session so that the shopper is provided with an integrated shopping experience. While the data exchange may experience some amount of delay due to computer or network processing, the shopper and the adviser perceive the viewing of product imagery and product metadata to be a contemporaneous experience.

While using the advisory shopping application 148 to view product data from the shopper, such as product images or metadata, the adviser may provide contemporaneous feedback to the shopper by interacting with the shopper-provided product data. For example, the adviser may graphically annotate a product image by drawing a circle or other shape around the image, thus indicating that the shopper should focus his attention on the annotated product. If a voice channel or other secondary channel is provided, the adviser may provide a voice comment about the product shared by the shopper. The adviser may also use this secondary channel to further emphasize the focus provided by an annotation. For example, if the session display seen by the adviser includes multiple bottles of ketchup on a shelf, the adviser may circle one of the bottles and then provide a voice comment to the shopper that says "Buy the bottle of ketchup that I circled."

The adviser may also use the advisory shopping application 148 to contemporaneously interact with shopper-provided metadata. For example, if the metadata is presented on a network detail page, the adviser may select, highlight, or annotate a portion of the page. In some embodiments, the adviser may interact with the metadata by taking temporary control of the cooperative shopping application 145. For example, if the metadata is presented in conjunction with user controls, the adviser may interact with the controls. In this manner, the adviser may perform actions like scrolling the shopper's session window, navigating to another network page, etc. In some embodiments, this "remote control" takeover feature is invoked by the adviser, for example, by activating a button in the cooperating shopping session window. In other embodiments, the shopper invokes the remote control feature. In still other embodiments, the remote control feature is invoked by the adviser, but the shopper is given an opportunity to refuse the takeover.

Once an adviser interacts with the product data shared by the cooperative shopping application 145, the advisory shopping application 148 contemporaneously provides this product interaction information to the cooperative shopping application 145. The cooperative shopping application 145 then updates the local display 136 of the mobile computing device 106 to reflect the adviser's interaction. For example, if the adviser circled a particular product image, the display 136 of the mobile computing device 106 is updated to include the circle. As another example, if the adviser used the remote control feature to take over control of the session, the cooperative shopping application 145 treats the product interaction data as user inputs, which results in an update of the display, just as if the shopper had interacted with the metadata locally.

In some embodiments of the cooperative shopping application 145, the shopper may bookmark particular products as products of interest and add these products to a virtual product shelf. The shopper may view the virtual product shelf and may share the virtual product shelf with the adviser. The adviser may then provide opinion and commentary on many products at once rather than commenting over a longer period of time as the user shops.

The cooperative shopping application 145 may also allow the user to bookmark segments of the captured product imagery for sharing with the adviser at a later time. For example, the shopper may spend a day trying on various items of clothing, and may bookmark video segments corresponding to some of the clothing items. At the end of the day, the shopper may share the bookmarked segments with the adviser in order to solicit comments from the adviser.

Figure 2:
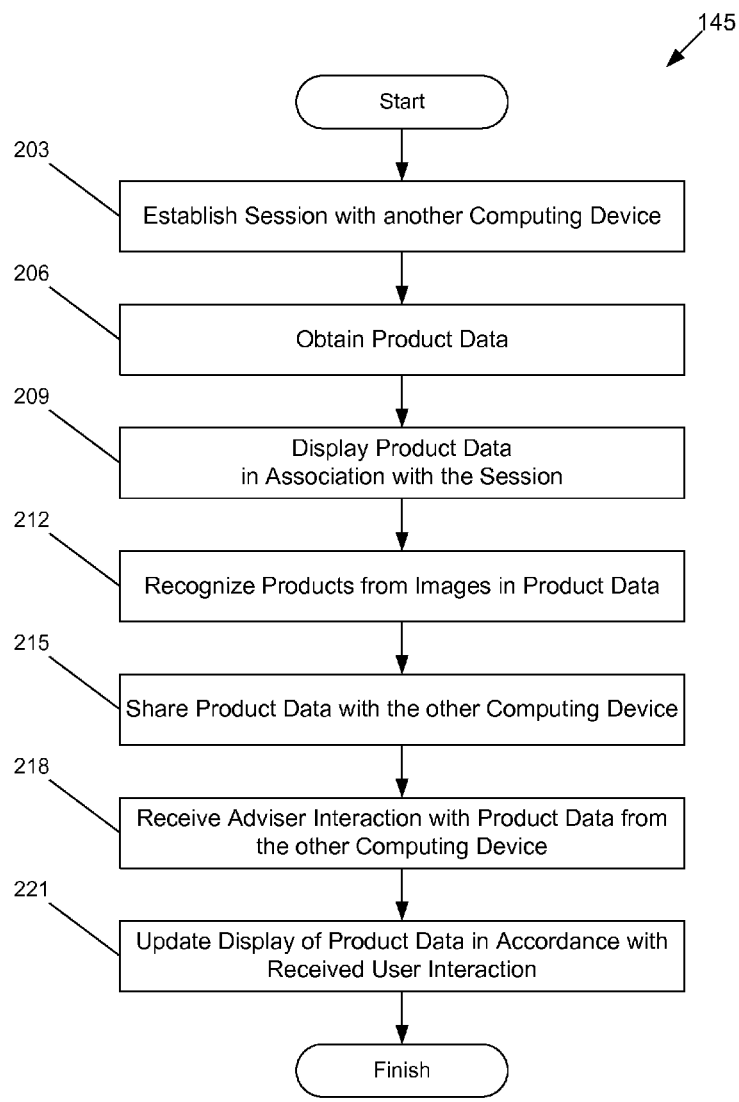
FIG. 2 is a flowchart illustrating an example of functionality implemented as portions of a cooperative shopping application executed in a mobile computing device in the networked environment of FIG. 1 according to various embodiments of the present disclosure.

Turning now to FIG. 2, shown is a flowchart that provides one example of the operation of portion(s) of the cooperative shopping application 145 according to various embodiments. It is understood that the flowchart of FIG. 2 provides merely an example of the many different types of functional arrangements that may be employed to implement the operation of portion(s) of the cooperative shopping application 145 as described herein. As an alternative, the flowchart of FIG. 2 may be viewed as depicting an example of steps of a method implemented in the mobile computing device 106 (FIG. 1) according to one or more embodiments.

Beginning at box 203, the cooperative shopping application 145 establishes a session with a computing device 109 (FIG. 1). More specifically, the cooperative shopping application 145 establishes a cooperative shopping session with an advisory shopping application 148 (FIG. 1) executing on the computing device 109. In some embodiments, the session is a peer-to-peer session. In other embodiments, the session involves an intermediary such as a cooperative shopping service 124 that is executing on the computing device 103. For example, the cooperative shopping service 124 may host or create a network site for communication between the two shopping applications 148, 145 and provide each application 148, 145 with a uniform resource locator (URL) that points to the network site. In some embodiments, the cooperative shopping session also includes a secondary communication channel such as a voice channel, a text message channel, or an instant message channel.

Next, at box 206, the cooperative shopping application 145 obtains product data. In some embodiments, the product data may include product metadata such as that obtained from the product catalog 130 (FIG. 1) stored on the computing device 103. In such cases, the cooperative shopping application 145 may allow a user of the mobile computing device 106 to specify products of interest in various ways, such as by entering a product identifier, using keywords to search for a product, and so on. The cooperative shopping application 145 may then query the product catalog 130 to obtain product metadata for products of interest. Such metadata may include, but is not limited to, price, description, reviews, and information about similar products. The product data may be provided in the form of a network page generated by the network page generation application 115 (FIG. 1). In some embodiments, the network page takes the form of a product detail page generated by the network page generation application 115 from data in the product catalog 130. In some embodiments, the product data obtained at box 206 includes product images captured by an image capture device 142 (FIG. 1) in communication with the mobile computing device 106. As noted above, the image capture device 142 may generates product imagery, which may take the form of a compressed video stream or a series of still images.

Next, at box 209, the cooperative shopping application 145 displays the product data in association with the session established at box 203. For example, the cooperative shopping application 145 may create a session window on the display 136 (FIG. 1) of the mobile computing device 106 and display all the product data in this session window, or may display data related to different products in different windows or different tabs or areas of the same session window.

Next, at box 212, the cooperative shopping application 145 recognizes products from any images included in the product data. This step is not performed if the product data does not include product images, as may be appreciated. The cooperative shopping application 145 may perform image recognition locally, or may utilize the services of the product image recognition service 121 (FIG. 1) that is executing on the computing device 103. The local or remote image recognition service looks for similarities between the images captured by the image capture device 142 and known product images stored in a database such as the product images 133 (FIG. 1) stored on the computing device 103. Once the image is recognized as being associated with a particular product identifier, the cooperative shopping application 145 may obtain additional information about the product from the product catalog 130, such as price, description, and so on.

Next, at box 215, the cooperative shopping application 145 contemporaneously shares the product data with the advisory shopping application 148 (FIG. 1) that is executing on the computing device 109, in the context of the established cooperative shopping session. As noted above, the shared product data may include product metadata and product images. The shared product data may also include locally generated data such as comments by the shopper that is using the cooperative shopping application 145, graphic annotations by the shopper to indicate areas of interest, and so on. As explained herein, the advisory shopping application 148 contemporaneously displays the shared product data to the user acting in the advisory role.

Next, at box 218, the cooperative shopping application 145 contemporaneously receives, from the advisory shopping application 148, an adviser interaction with the product data. As explained above, the user acting in the adviser role of the cooperative shopping session can contemporaneously provide feedback to the user acting in the shopping role by interacting with the product data that was shared at box 215. The type of feedback may depend on the type of product data. As one example, when product images are shared, the adviser may annotate the product images by drawing on or near a product image, for example, drawing a circle or other region around the image of a particular product of interest. Such graphical interaction may be described in terms of drawing instructions to be performed in connection with an existing product image, or may instead be communicated as bitmaps that are used to replace or augment an existing product image.

As another example, when product metadata is shared, the adviser may interact with the product metadata displayed on his screen by interacting with various user interface controls that are displayed in association with the product metadata. For example, if the product metadata is displayed as a network detail page rendered by the advisory shopping application 148, the adviser user may interact with the page by selecting hyperlinks, clicking on buttons, and so on. Such user interface interactions are received by the cooperative shopping application 145 at box 218, and acted upon as if the actions performed by the adviser were performed by the local user that is acting in the role of shopper. The cooperative shopping application 145 may utilize the services of the input/output redirection service 118 (FIG. 1) that is executing on the computing device 103 to perform this redirection of user input.

Next, at box 221, the cooperative shopping application 145 updates the display of product data in accordance with the user interaction that was received at box 218. The mechanism used to update the display may depend on the type of product data that is shared at box 215. For example, if product images are shared, the cooperative shopping application 145 may generate a graphic overlay corresponding to the received user interaction. As another example, if product metadata is shared, the cooperative shopping application 145 may treat the user interaction received from the adviser at box 218 as locally generated user input, which results in a new network page or update to the existing network page.

Having shared product data with the adviser and received and displayed the adviser's interaction with the product data, the process of FIG. 2 is then complete. Though not explicitly shown in FIG. 2, the functionality of boxes 203-218 may be repeated.

Figure 3:
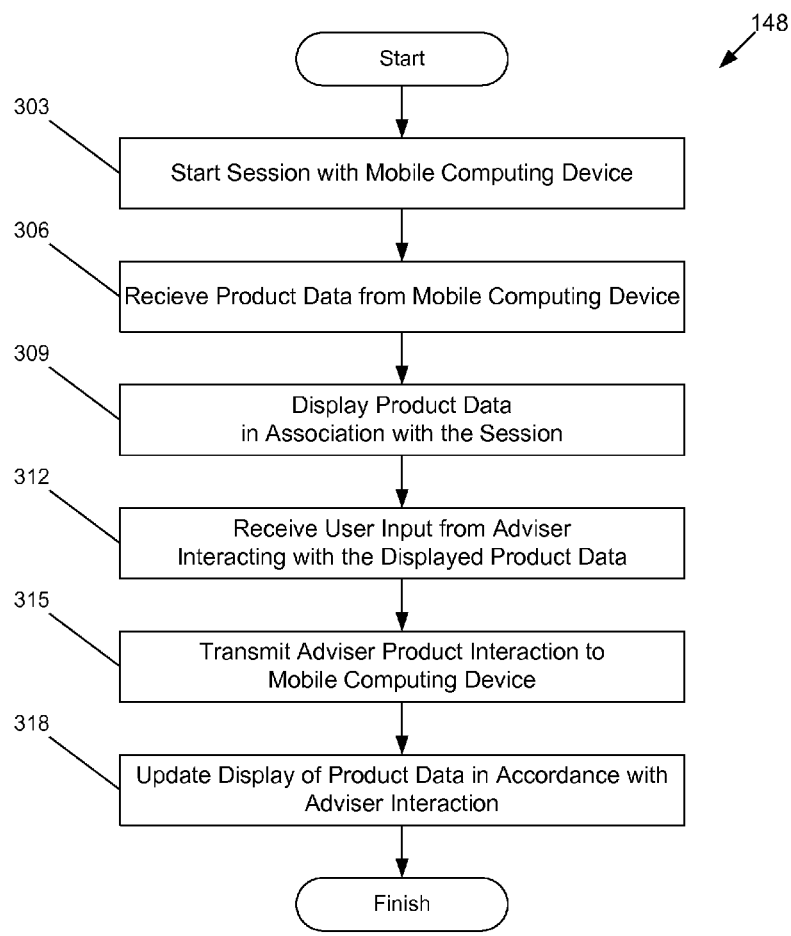
FIG. 3 is a flowchart illustrating an example of functionality implemented as portions of an advisory shopping application executed in a computing device in the networked environment of FIG. 1 according to various embodiments of the present disclosure.

Moving on to FIG. 3, shown is a flowchart that provides one example of the operation of portion(s) of the advisory shopping application 148 according to various embodiments. It is understood that the flowchart of FIG. 3 provides merely an example of the many different types of functional arrangements that may be employed to implement the operation of portion(s) of the advisory shopping application 148 as described herein. As an alternative, the flowchart of FIG. 3 may be viewed as depicting an example of steps of a method implemented in the computing device 109 (FIG. 1) according to one or more embodiments.

Beginning at box 303, the advisory shopping application 148 starts a cooperative shopping session with a cooperative shopping application 145 (FIG. 1) that is executing on the mobile computing device 106 (FIG. 1). The session may be created in response to a request or instruction from the cooperative shopping application 145. As noted herein, the session may be peer-to-peer session or may involve an intermediary such as a cooperative shopping service 124 that is executing on the computing device 103. As also noted herein, the cooperative shopping session may also include a secondary communication channel such as a voice channel, a text message channel, or an instant message channel.

Next, at box 306, the advisory shopping application 148 contemporaneously receives product data from the cooperative shopping application 145. One example of product data includes product images captured by an image capture device 142 (FIG. 1) in the mobile computing device 106. Product metadata is another example of product data received at box 306 from the cooperative shopping application 145.

Next, at box 309, the advisory shopping application 148 displays the received product data in association with the session established at box 303. For example, the advisory shopping application 148 may create a session window on the display 136 (FIG. 1) of the computing device 109 and display all the product data in this session window, or may display data related to different products in different windows or different tabs or areas of the same session window.

Next, at box 312, the advisory shopping application 148 receives user input as the adviser interacts with the displayed product data. As explained above, the user acting in the adviser role of the cooperative shopping session can provide feedback to the user acting in the shopping role by interacting with the product data that was received at box 306. The type of feedback may depend on the type of product data. As one example, when product images are shared, the adviser may annotate the product images by drawing on or near a product image, for example, drawing a circle or other region around the image of a particular product of interest.

As another example, when product metadata is shared, the adviser may interact with the product metadata displayed on his screen by interacting with various user interface controls that are displayed in association with the product metadata. For example, if the product metadata is displayed as a network detail page rendered by the advisory shopping application 148, the adviser user may interact with the page by selecting hyperlinks, clicking on buttons, and so on. When received by the cooperative shopping application 145, the inputs are acted upon as if the actions performed by the adviser were performed by the local user that is acting in the role of shopper.

Next, at box 315, the advisory shopping application 148 contemporaneously communicates the adviser interaction to the cooperative shopping application 145. In embodiments in which the adviser interacts graphically with a product image, such graphical interaction may be communicated to the cooperative shopping application 145 in terms of drawing instructions to be performed in connection with an existing product image, or may instead be communicated as bitmaps that are used to replace or augment an existing product image. In embodiments in which the adviser interacts with product metadata, for example, as rendered on a network page, the interaction may be communicated to the cooperative shopping application 145 in terms of user interface events such as keystrokes, mouse events, gesture events, and so on, as may be appreciated.

Next, at box 318, the advisory shopping application 148 updates the local display 139 (FIG. 1) attached to the computing device 109 in accordance with the adviser interaction with the product data. That is, the adviser's actions are reflected locally as well as being transmitted to the remote mobile computing device 106. In this manner, the adviser sees his own actions at substantially the same time that the shopper sees the adviser's actions, thus providing an enhanced cooperative shopping experience. The process of FIG. 3 is then complete.

Figure 4:
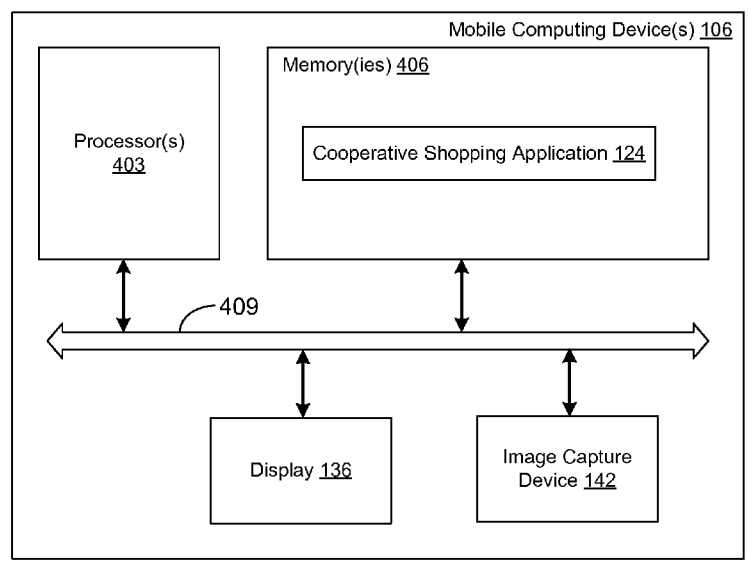
FIG. 4 is a schematic block diagram that provides one example illustration of a mobile computing device employed in the networked environment of FIG. 1 according to various embodiments of the present disclosure.

With reference now to FIG. 4, shown is a schematic block diagram of the mobile computing device 106 according to an embodiment of the present disclosure. The mobile computing device 106 includes at least one processor circuit, for example, having a processor 403 and a memory 406, both of which are coupled to a local interface 409. To this end, the mobile computing device 106 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the cooperative shopping application 145 and potentially other applications. In addition, an operating system may be stored in the processor 403 and executable by the processor 403. While not illustrated, the computing device 109 (FIG. 1) also includes components like those shown in FIG. 4, whereby the advisory shopping application 148 (FIG. 1) is stored in a memory and executable by a processor. Moreover, while not illustrated, the computing device 103 (FIG. 1) includes components like those shown in FIG. 4, whereby the network page generation application 115, the input/output redirection service 118, the product image recognition service 121, and the cooperative shopping application 145 (FIG. 1) are stored in a memory and executable by a processor.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and executed by the processor 403, source code that may be expressed in proper format such as object code that is capable of being loaded into a random access portion of the memory 406 and executed by the processor 403, or source code that may be interpreted by another executable program to generate instructions in a random access portion of the memory 406 and executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors and the memory 406 may represent multiple memories that operate in parallel processing circuits, respectively. In such a case, the local interface 409 may be an appropriate network 112 (FIG. 1) that facilitates communication between any two of the multiple processors 403, between any of the processors 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page generation application 115, the input/output redirection service 118, the product image recognition service 121, and the cooperative shopping application 145, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the cooperative shopping application 145 and the advisory shopping application 148, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in the flowcharts of FIGS. 2 and 3 may be executed concurrently or with partial concurrence. Further, in some embodiments, one or more of the blocks shown in the flowcharts of FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including cooperative shopping application 145 and the advisory shopping application 148) that comprises software or code can be embodied in any non-transitory computer-readable medium for use by or in connection with an instruction execution system such as, for example, the processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program, when executed, causing the computing device to at least:
   establish a session with another computing device;
   receive product metadata in association with the session;
   capture a live video stream of one or more physical products located in a retail location by a video capture device of the computing device;
   identify a physical product in the live video stream based at least in part on a comparison between the live video stream and at least one identified product image;
   display the product metadata and the live video stream of the one or more physical products in association with the session;
   transmit the product metadata and the live video stream of the one or more physical products to the another computing device in association with the session;
   receive a user input, from the another computing device and in association with the session, the user input indicating an annotation to the displayed live video stream;
   display the annotation to the displayed live video stream in association with the session;
   receive, from the another computing device, a request to establish a remote control by the another computing device of an application executed in the computing device facilitating the session;
   in response to an acceptance of the request, remotely control the application executed in the computing device, the computing device being associated with the session by the another computing device;
   inhibit, in response to a denial of the request, remote control of the application executed in the computing device, the computing device being associated with the session by the another computing device; and
   display another annotation indicated by another user input, the annotation being applied to a virtual product shelf comprising a plurality of selected physical products.

2. The non-transitory computer readable medium of claim 1, wherein the program further causes the computing device to modify display of the live video stream of the one or more physical products with an overlay including the annotation.

3. A method, comprising:
   establishing a session by a mobile computing device with a remote computing device, the mobile computing device comprising a video capture device;
   capturing contemporaneous product imagery of a physical product located in a retail location with the video capture device;
   displaying, by the mobile computing device, product data in association with the session, the product data comprising the contemporaneous product imagery;
   identifying, by the mobile computing device, the physical product in the contemporaneous product imagery based at least in part on a comparison between the contemporaneous product imagery and at least one identified product image;
   contemporaneously sharing, by the mobile computing device, the product data with the remote computing device in association with the session;
   receiving, by the mobile computing device, an indication of a user interaction with the product data at the remote computing device in association with the session;
   contemporaneously rendering, by the mobile computing device, the user interaction with the product data in conjunction with the product data and in association with the session;
   receiving, from the remote computing device, a request to establish a remote control, by the remote computing device, of an application executed in the mobile computing device facilitating the session;

remotely controlling, in response to an acceptance of the request, by the mobile computing device, the application executed in the mobile computing device associated with the session by the remote computing device;

inhibiting, in response to a denial of the request, by the mobile computing device, the remote control of the application executed in the mobile computing device associated with the session by the remote computing device; and displaying an annotation from the remote computing device as applied to a virtual product comprising a plurality of selected products.

4. The method of claim 3, further comprising interpreting the user interaction with the product data as a user input to the mobile computing device.

5. The method of claim 4, wherein the user input comprises at least one of a key event, a mouse event, or a gesture.

6. The method of claim 3, wherein the indication of the user interaction with the product data comprises a voice comment.

7. The method of claim 3, wherein displaying the user interaction with the product data in conjunction with the product data further comprises updating the display of the product data in accordance with received user interaction with the product data.

8. The method of claim 3, wherein displaying user interaction with the product data further comprises updating the display with an overlay including the indication of the user interaction with the product data.

9. The method of claim 3, wherein the product data further comprises product metadata.

10. The method of claim 3, wherein identifying the physical product in the contemporaneous product imagery further comprises:

transmitting a query including an image in the contemporaneous product imagery to a product image recognition service performing the comparison; and receiving a result corresponding to the query from the product image recognition service, the result including a product identifier.

11. The method of claim 10, further comprising displaying the product identifier received from the product image recognition service.

12. The method of claim 10, wherein the result further includes product metadata associated with the product identifier.

13. The method of claim 10, further comprising:

receiving a selection of the physical product represented by the product data;

in response to the selection, adding the selected physical product to a virtual product shelf; and displaying a visual representation of the virtual product shelf in association with the session.

14. A system, comprising:

a first computing device comprising a processor, a memory, and a video capture device; and machine readable instructions stored in the memory that, when executed by the processor, cause the first computing device to at least:

establish a session with a second computing device;
receive product metadata in association with the session;
capture a live video stream of one or more physical products located in a retail location by the video capture device of the first computing device;

identify a physical product in the live video stream based at least in part on a comparison between the live video stream and at least one identified product image;

display the product metadata and the live video stream of the one or more physical products in association with the session;

transmit the product metadata and the live video stream of the one or more physical products to the second computing device in association with the session;

receive a user input, from the second computing device and in association with the session, the user input indicating an annotation to the displayed live video stream;

display the annotation to the displayed live video stream in association with the session;

receive, from the second computing device, a request to establish a remote control by the second computing device of an application executed in the first computing device facilitating the session;

in response to an acceptance of the request, remotely control the application executed in the first computing device, the first computing device being associated with the session by the second computing device;

inhibit, in response to a denial of the request, remote control of the application executed in the first computing device, the first computing device being associated with the session by the second computing device; and display another annotation indicated by another user input, the annotation being applied to a virtual product shelf comprising a plurality of selected physical products.

15. The system of claim 14, wherein the annotation indicates a selection of a portion of the displayed physical product in the live video stream.

16. The system of claim 14, wherein the annotation indicates an addition of a graphical object to a portion of the displayed live video stream.

17. The system of claim 14, wherein the annotation is a first annotation and the machine readable instructions further cause the first computing device to communicate a second annotation to the second computing device, wherein the second annotation is applied to a virtual product shelf comprising a plurality of selected products.

18. The system of claim 17, wherein the machine readable instructions further cause the first computing device to:

receive, from the second computing device and in association with the session, a list of the plurality of selected products of the virtual product shelf; and display a visual representation of the virtual product shelf in association with the session.

19. The system of claim 14, wherein an identification of the physical product in the live video stream based at least in part on the comparison between the live video stream and the at least one identified product image is generated by a product image recognition service.

20. The system of claim 14, wherein the machine readable instructions further cause the first computing device to create a voice channel between the first computing device and the second computing device in association with the session.

21. The system of claim 14, wherein the machine readable instructions further cause the first computing device to a multimedia channel between the first computing device and the second computing device in association with the session.

22. The system of claim 14, wherein the user input comprises a gesture on a touch screen of the second computing device.

23. The system of claim 14, wherein the user input comprises a key event.

24. The system of claim 14, wherein the user input comprises a mouse event.

\* \* \* \* \*